United States Patent [19]

Kennicott

[11] 4,044,655

[45] Aug. 30, 1977

[54] HIGH PRESSURE PLUNGER AND METHOD OF MANUFACTURE

[75] Inventor: Wilbur L. Kennicott, Ligonier, Pa.

[73] Assignee: Kennametal Inc., Latrobe, Pa.

[21] Appl. No.: 618,412

[22] Filed: Oct. 1, 1975

[51] Int. Cl.² .............................................. F16J 1/02
[52] U.S. Cl. ................................ 92/258; 29/156.5 R;
29/447
[58] Field of Search ............... 29/156.5, 447; 277/226;
92/257, 258, 259

[56] References Cited

U.S. PATENT DOCUMENTS

| 1,751,350 | 3/1930 | Moyer et al. ........................... 92/258 |
| 2,413,347 | 12/1946 | Hamilton et al. ................... 92/258 X |
| 2,851,903 | 9/1958 | Norris et al. ....................... 92/258 X |
| 2,852,652 | 9/1958 | Rose et al. ............................ 29/447 X |
| 3,015,529 | 1/1962 | Hardcastle ............................ 92/257 |
| 3,055,670 | 9/1962 | Sampson .......................... 277/226 X |
| 3,404,606 | 10/1968 | Papst .................................. 92/222 X |

FOREIGN PATENT DOCUMENTS

| 1,072,849 | 1/1960 | Germany ............................... 92/258 |
| 86,114 | 8/1957 | Netherlands ........................... 92/258 |

Primary Examiner—Irwin C. Cohen
Attorney, Agent, or Firm—Lawrence R. Burns

[57] ABSTRACT

A high pressure plunger and a method of making for use in piston-cylinder like apparatus which are used for the high pressure compression of gases up to, for example, approximately 40,000 p.s.i. A high pressure plunger of the present invention comprises a tubular member of hard wear resistant material whose opposing ends are abuttingly engaged by steel end caps with the steel end caps being interconnected internally of the tubular section with a tension member so as to hold the tubular member in compression.

3 Claims, 4 Drawing Figures

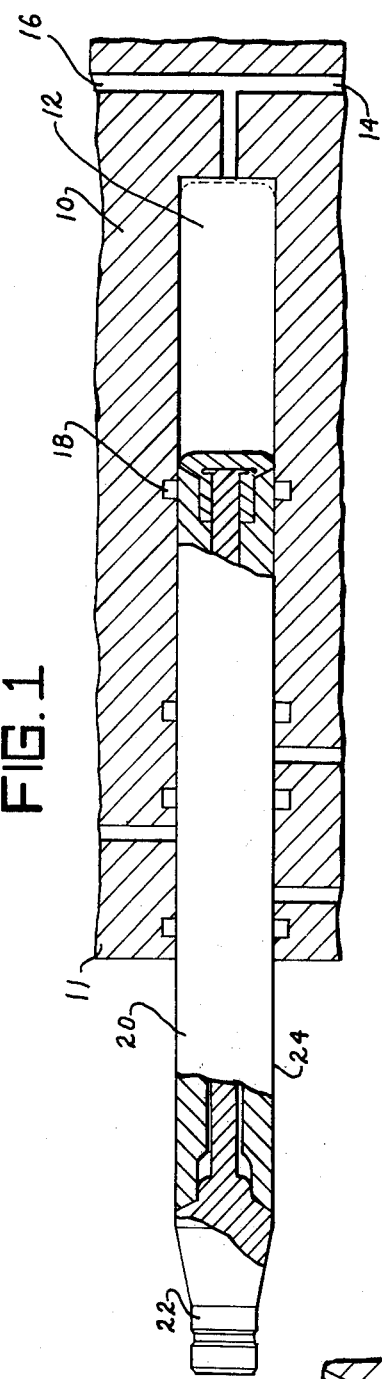
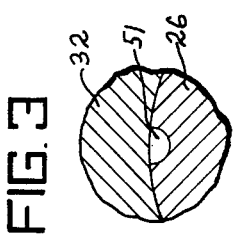
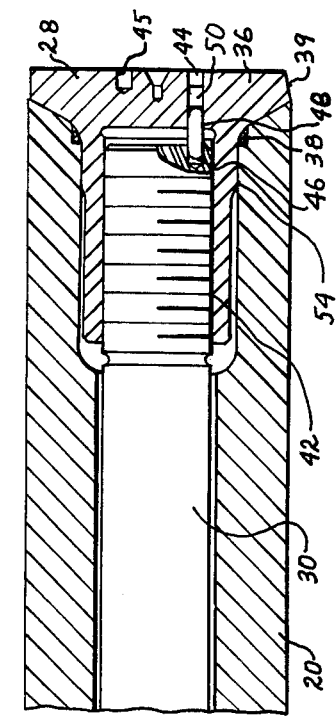
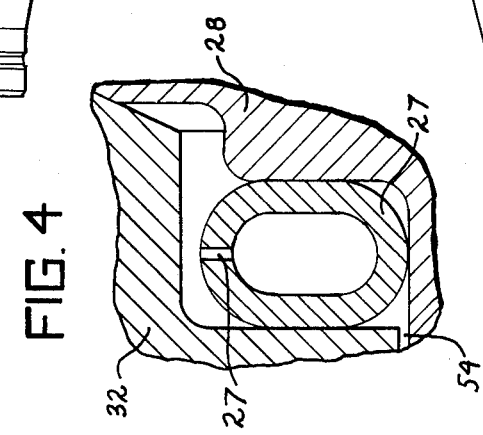

HIGH PRESSURE PLUNGER AND METHOD OF MANUFACTURE

BACKGROUND OF THE INVENTION

Piston-cylinder like machines are used in industry for the compression of certain gases to very high pressures. These gases at very high pressures have various uses, in particular, in the manufacture of polyethylene plastics.

One of the intermediate steps in the manufacture of these plastics is the compression of the polyethylene gas to pressures of approximately 40,000 p.s.i. The compression of the polyethylene gas may take place in several stages using piston-cylinder type apparatus to achieve the desired final pressure of the polyethylene gas.

Because of the very high pressures involved with the compression of the polyethylene gas, the piston-cylinder like machines usually consist of heavily reinforced cylinders having a compression chamber therein, the compression chamber having a high length-over-diameter ratio thereby requiring a cooperating plunger which, also, must have a very high length-over-diameter ratio. Seal means are usually provided between the compression cylinder and the plunger so that the plunger may reciprocate longitudinally in the compression cylinder.

With the piston in its first position in the heavily reinforced cylinder, inlet gases are fed into the compression chamber through an inlet means in the chamber. The valve in the inlet means is then closed and the piston is advanced into the compression chamber compressing the gas in the compression chamber and forcing the gas to flow through an outlet means into a further compression chamber at a higher pressure.

The outlet means is normally provided with a check valve or other equivalent to prevent the higher pressure gases from the second compression chamber from backflowing into the compression cylinder when the plunger is retracted outwardly from the compression chamber to allow the compression chamber to accept more gas from the inlet means.

The very high pressures created in the compression chamber and forces on the plunger required to create those pressures in the above described apparatus require that the outside diameter of the plunger and the inside diameter of the compression cylinder form a very close fit and yet still have a smooth sliding engagement to allow the plunger to reciprocate in the compression cylinder. As the plunger is advanced and begins to compress the gases, extremely high forces on the plunger and the high length-over-diameter ratio of the plunger require that the plunger be extremely rigid so as to maintain a very strict overall straightness requirement.

Straightness is required to reduce unnecessary wear on the plunger and seals while engaging with the cylinder and to further prevent the unsupported length of the plunger from fracture. Further, the outside diameter of the plunger must be made of a hard wear resistant material in order to reduce wear on the plunger and seals during its sliding engagement with the compression cylinder walls and must further resist undue radial expansion when encountering compressive stresses.

Previously, machines as described above have used solid plungers formed of a hard wear resistant material; this material has operated very satisfactorily in these types of apparatus. The extreme rigidity provided by a hard wear resistant material and its superior strength when in compression have helped to reduce any catastrophic failures which can and do occur when the plunger is advanced into the compression cylinder.

These catastrophic failures usually occur because there is a long, unsupported length of the plunger when it first begins to advance into the compression cylinder and compress the gases. Plungers formed of material such as cemented hard metal carbide have been found very satisfactory for plungers up to a diameter of approximately 3 to 4 inches and an overall length of approximately 40 to 50 inches.

Recently, however, piston-cylinder like apparatuses as described above have been made in which the diameter of the chamber used to compress the gases has been increased to approximately six or seven inches. The cemented hard metal carbide plungers which were used with the smaller diameter compression chambers normally had a weight of approximately 400 pounds, but to make a solid cemented hard metal carbide plunger to cooperate with the newly enlarged compression chambers would require a plunger whose weight might exceed 1,000 pounds and become very cumbersome to manufacture and handle. Furthermore, such massive carbide members are difficult to sinter without developing cracks or fissures therein or setting up strains therein.

In addition, hard wear resistant materials such as cemented hard metal carbide are very expensive materials as compared to steel and, therefore, the economic efficiency of producing such a plunger becomes questionable.

It is an object of the present invention to provide the enlarged plungers without making the plungers of a solid piece of carbide and yet to maintain the structural integrity necessary for the plunger to operate in such extreme environments.

It is a further object of the present invention to produce economically feasible plungers for use in the enlarged compression cylinders.

BRIEF SUMMARY OF THE INVENTION

According to the present invention, a high pressure plunger is provided which comprises a tubular member of a hard wear resistant material having opposing ends and front and rear end caps abuttingly engaged on each end of the member with the end caps being interconnected internally of the tubular member and holding the tubular member in a predetermined state of compression.

The hard wear resistant material, advantageously, has a very high compression strength when compared to its tensile strength and its coefficient of thermal expansion is lower than that of steel. The end caps and the means of interconnection between the end caps are then made of steel or any other metal having a higher coefficient of thermal expansion than the hard wear resistant material. A rear end cap is adapted on the other end from its abutting engagement with the tubular member so as to drive the plunger in a reciprocating manner in a pressure cylinder.

A seal means is provided between the front end cap on the forward end of the plunger and the tubular element so as to prevent any gases from penetrating to the region inside the tubular plunger when the forward end of the plunger is advancing and compressing gases in the pressure cylinder. On the rearward end of the plunger, between the tubular element and the rear end cap, relief orifices are provided connecting the inside region of the tubular member to the outside atmosphere thereby insuring that, should any of the gas being compressed leak into the internal region in the tubular member, the gas would immediately escape back to the outside atmosphere through the orifices without fracturing or damaging the tubular member.

The tubular member is provided on its inside diameter and near the ends which engage the end caps with pilot diameters so as to align the caps as they are pulled into abutment with the tubular member. The abutment surfaces between the end caps and the tubular member are inclined in such a manner as to provide self-centering between the end caps and tubular member when the tubular member is compressed. The forward end cap is provided on its front face with two holes extending inwardly from the front face of the front end cap so that a spanner wrench may engage and torque the forward end cap means into threaded engagement with means connecting the other end cap.

One of the holes provided in the forward face of the front end cap is a through hole which mates with a similar hole in the forward end of the means connecting the end caps. A dowel pin is pressed far enough into the first hole so that it extends through and engages the second hole and thereby holds the end cap from relative rotation with the means connecting the end caps. A brass plug having an inteference fit with the dowel pin hole is then pushed down into the dowel pin hole to seal it in high pressure gases.

The plunger is assembled by first assembling the tubular member and the end caps at room temperature without the tubular member being held in compression. The entire assembly is then placed in an oven and heated at an elevated temperature and the end caps are adjusted to impart a predetermined compressive force on the tubular member The entire assembly is then allowed to cool to room temperature.

The exact nature of the present invention will become more apparent upon reference to the following detailed specification taken in connection with the accompanying drawings in which:

FIG. 1 is a cut away view of a piston-cylinder like apparatus using a plunger of the present invention.

FIG. 2 is a plan view in partial cut away showing a detailed construction of the plunger of the present invention.

FIG. 3 is a cross sectional view as shown by arrows III—III in FIG. 2.

FIG. 4 is an enlarged view of the crushable metallic seal ring shown in FIG. 2.

DETAILED DESCRIPTION OF THE INVENTION

Referring now to FIG. 1, 10 is a heavily reinforced cylinder having a compression chamber 12, inlet means 14 and an outlet means 16. The compression chamber 12 is provided with seals 18 along the rearward portion of compression chamber 12 where plunger 20 is shown located in its first position. Plunger 20 is engaged by a linear reciprocating drive mechanism (not shown) on end 22 so that it may be advanced and retracted between the first position as shown in FIG. 1 and the second position shown by the dotted line at the forward end of compression chamber 12 also shown in FIG. 1.

The operation of the piston-cylinder apparatus shown is as follows: With plunger 20 in its first position, gases are admitted into compression chamber 12 from inlet means 14. A valve (not shown) on inlet means 14 may then be closed off so as to contain the gas in the compression chamber 12. Outlet means 16 is normally provided with a check valve allowing flow in one direction only (not shown) which allows the flow of gases outward along outlet means 16 from the compression chamber when these gases reach a desired or predetermined pressure.

With the gas having been admitted to pressure chamber 12, plunger 20 is then advanced into its second position and thereby compresses the gases to the predetermined higher pressure and causes them to flow through outlet means 16 to a second compression chamber (not shown). The particular compression step shown may be but one of several stages of compression the gases will undergo.

The problems associated with the piston like cylinder as shown and described above are that the plunger member 20 must, first of all, have an outside diameter forming a close fit with the inside diameter of compression chamber 12 and which will resist the wear imparted by the seals 18 during the reciprocating motion of plunger 20.

Further, because of the high pressure of the gases in compression chamber 12, the axial force on plunger 20 tends to compress whatever material plunger 20 is made of and bulge it outward thereby tending to bind plunger 20 on the inside diameter of compression chamber 12 during movement from position one to position two. Extreme rigidity of plunger 20 is also required in the unsupported lengths 24 which extends between the rear end 11 of reinforced pressure cylinder 10 and end 22 which is adapted for driving engagement with the power drive source.

If plunger 20 is not extremely rigid, the unsupported length will tend to deflect from its axial alignment with compression chamber 12 and thereby either begin to wear the rearward inside diameter walls of compression chamber 12 or cause catastrophic failure of the plunger by rupturing or fracturing the plunger.

In FIG. 2 is shown a plunger according to the present invention which is intended for larger diameter compression chambers 12 or where it would not be feasible to make plunger 20 out of a solid piece of hard wear resistant material. Plunger 20 is shown comprising a rearward end cap 26 and a forward end cap 28 with a means 30 interconnecting end caps 26 and 28. Tubular member 32, made from a hard wear resistant material, is provided having opposing ends for abutting engagement with end caps 26 and 28.

The forward end abutment surface 34 abuts an enlarged head portion 36 of end cap 28 and interposed between end cap 28 and tubular member 32 is a seal meand 38 which is preferably a crushable metallic ring. Rear end cap 26 is provided with engagement end 22 so as drivingly to engage plunger 20 in reciprocating type motion from a power source. The means 30 interconnecting the end caps 26 and 28 is shown herein as a reduced diameter portion extending forwardly from rear end cap 28. The threaded engagement 42 compressively holds the tubular member between and in engagement with end caps 26 and 28 and thereby provides plunger 20 with extreme rigidity and strength.

Extending through forward end cap 28 is a through hole 44 which meets with a similar hole 46 in the forward end of interconnecting means 30. A dowel pin 48 having an interference fit with hole 44 is pressed down through hole 44 so that the pin 48 engages both holes 46 and 44. Immediately above the dowel pin 48 in hole 44 a brass plug assembly 50 also having an inteference fit with hole 44 is provided as a seal means between the high compressed gases in compression chamber 12 and the internal area of tubular member 32.

Hole 45 is provided so that a spanner wrench may engage holes 45 and 48 to provide torque movement of end cap 28 when plunger 20 is being assembled. Tubular member 32 on its inside diameter and near the ends where it engages end caps 26 and 28 is provided with the pilot diameters 52 and 54 so that when end caps 26 and 28 are engaged with tubular member 32 the outside diameters of the tubular member and the end caps are kept in very close alignment. The abutting shoulders between the end caps and the tubular member are tapered so as to provide a self-centering effect as the tubular member is drawn into compression by the end caps 28 and 26.

Rear end cap 26, tubular member 32, and forward end cap 28 have outside diameters selected so that, when tubular member 32 is held compressively by the end caps 26 and 28, the mating outside diameters are substantially the same within a few ten thousandths of one another and are mated as flush as possible with one another. Forward end cap 28 is provided with a slight taper forwardly in the radially inner direction so that the plunger 20, when being assembled into compression chamber 12, will allow seals 18 to expand and slide over forward end cap 28 without damage to seals 18.

Once plunger 20 is assembled in compression chamber 12, the normal operation of advancing and retracting plunger 20 from its first and second positions will only require seals 18 to slide upon the O. D. of tubular member 32. Seals 18 will not have to slide over the mating surfaces of end caps 26 and 28 with tubular member 32 when in operation. The only time seals 18 will slide over the mating surfaces of the end caps with the tubular member is when the plunger 20 and reinforced cylinder 10 are being assembled or disassembled.

Plunger 20 is made by the method which comprises forming tubular member 32 of a hard wear resistant material such as cemented hard metal carbide. End cap member 26 is formed of a steel material, preferably 4340 steel, and has a rearward end 22 which has formed thereon means for engagement with a power drive source and on the opposed end form 22 the means 30 interconnecting said caps is formed by a reduced diameter extension extending forwardly from end cap 26. On the forward end of this extension, threads are provided so as to threadingly engage end cap member 28.

End cap member 28 is also made of a steel material, preferably 4340 steel. The cemented hard metal carbide advantageously has a lower coefficient of thermal expansion than the preferred 4340 steel and the plunger 20 may then be assembled as follows: Tubular member 32 is slid down over the extension of end cap 26 until it is in abutting engagement with end cap element 26 and then end cap member 28 is placed inside tubular member 32 and threadedly advanced on the extension of end cap 26 until end cap 28 abuts the other end of tubular member 32. End cap 28 is tightened finger tight and, therefore, tubular member 32, at this point, is not held compressively between the end caps.

The entire assembly of end caps 26 and 28 and tubular member 32 is then placed in a furnace, while resting on a cradle in the furnace, and heated to approximately 400° Fahrenheit. Because of the differences in the coefficient of thermal expansion between the cemeted metal carbide and 4340 steel, the extension portion of end cap 26 expands in a longitudinal direction more than the cemented hard metal carbide tubular member 32.

With this assembly at the elevated temperature of 400° Fahrenheit, a spanner wrench is engaged in the holes provided on the forward face of end cap 28 and the end cap 28 is then threadedly advanced on the extension portion of end cap 26 until a predetermined compressive force has been applied to tubular member 32. The assembly is then allowed to cool to room temperature thereby causing the extension portion of end cap 26 to tend to shrink in length at a faster rate than the tubular member 32 thereby imparting a predetermined compressive force on tubular member 32.

At this point, a drill is extended through hole 44 and hole 46 is drilled so that it is in alignment with hole 46. The drill is then removed and dowel pin 46 is inserted in through hole 44 and into the forward part of interconnecting means 30. Brass plug 50 is then inserted down in hole 44 so as to provide a seal in hole 44.

In FIG. 3 is shown a cross sectional view as shown by arrows III—III in FIG. 2. Shown therein is orifice shown between rear end cap 26 and tubular member 32. As has been mentioned, this orifice is provided for relief of any pressure that may happen to build up in the internal region of tubular member 32.

In FIG. 4 is shown an enlarged view of the crushable metallic seal 38 located between the tubular member 32 and the forward end cap 28. The crushable metallic seal 38 is in the form of a tubular ring with the tubular ring having a hole formed on the outer side thereof so that any pressure leakage through the abutment surfaces will enter the tubular crushable ring and act to expand it further and thereby effect a tighter seal.

Modifications may be made within the scope of the appended claims.

What is claimed is:

1. A high pressure plunger comprising a tubular member of cemented hard metal carbide, said tubular member having a length over diameter ratio of at least six to one, and having opposite ends, steel end caps abutting the opposite ends of said tubular member and each end cap having an axial portion engaging the inside of said tubular member adjacent the respective end cap, a rod-like portion on one of said end caps extending axially through said member with radial clearance and threadedly connected to the other end cap for interconnecting said end caps internally of said tubular member and holding said tubular member in a predetermined, compressively stressed condition, one of said end caps forming the rearward end of said plunger and the other end cap forming the forward end of said plunger, said rearward cap adapted for engagement to be driven linearly, a deformable metallic seal inerposed between said forward end cap and said tubular member sealing the internal region of said tubular member from the atmosphere surrounding the forward end of the plunger, and orifice means formed between the rear end cap and the tubular member connecting the internal region of the tubular member with the atmosphere surrounding the rear cap of the plunger.

2. The high pressure plunger according to claim 1 in which the regions of abutment of said end caps and said tubular member are tapered outwardly in the direction toward the respective end of the tubular member.

3. The high pressure plunger according to claim 1 which the cemented hard metal carbide material comprises tungsten carbide.

* * * * *